Patented Dec. 29, 1925.

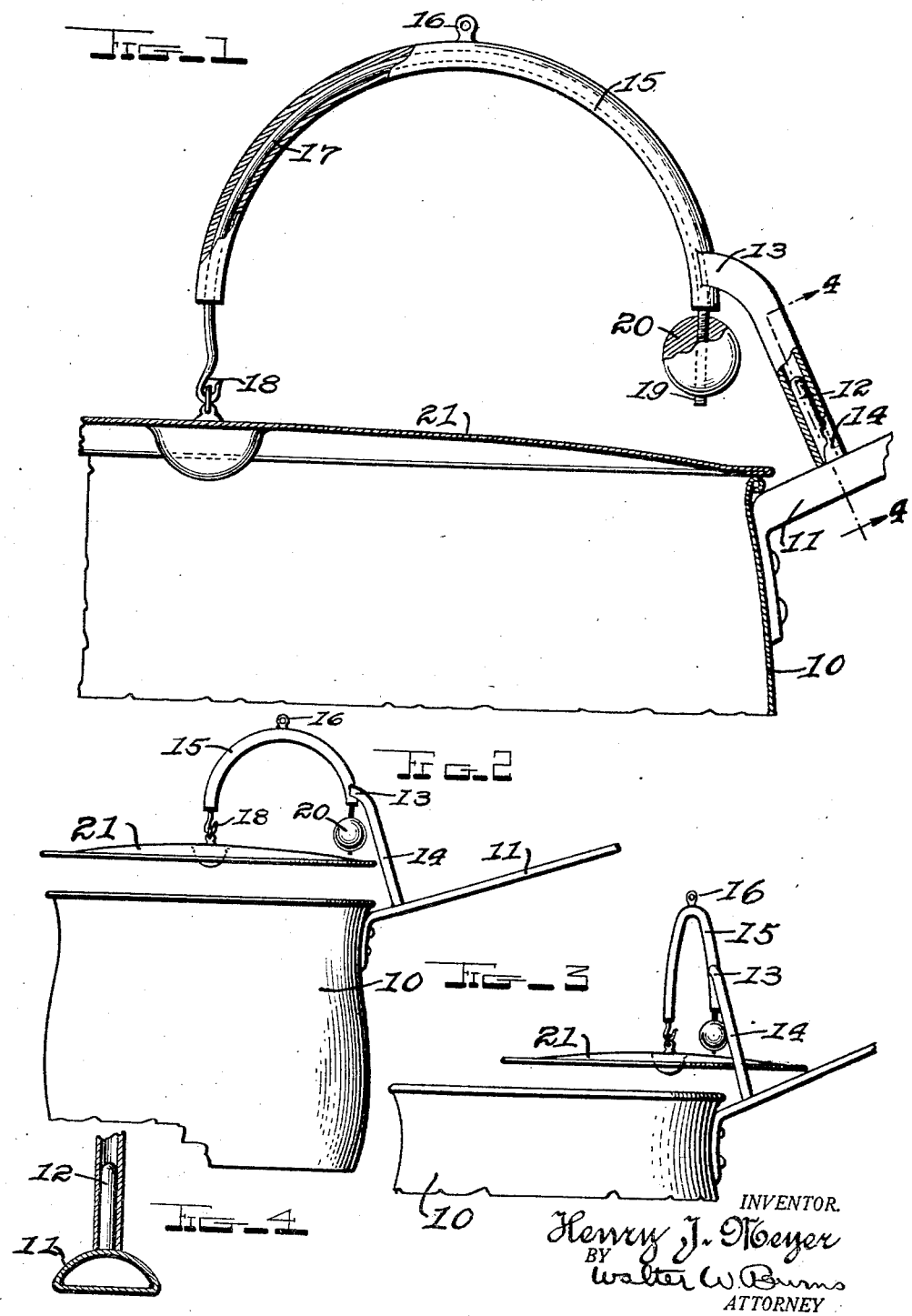

1,567,160

UNITED STATES PATENT OFFICE.

HENRY J. MEYER, OF NEW ORLEANS, LOUISIANA.

COOKING-UTENSIL-COVER SUPPORT.

Application filed August 27, 1924. Serial No. 734,518.

*To all whom it may concern:*

Be it known that I, HENRY J. MEYER, a resident of New Orleans, parish of Orleans, State of Louisiana, a citizen of the United States, have invented certain new and useful Improvements in Cooking-Utensil-Cover Supports, of which the following is a specification.

This invention relates to cooking utensils and particularly to those cooking utensils which have apparatus making the cover susceptible to the rapid generation of steam in the liquid within the utensil.

In using the cooking utensils in common use, difficulty is frequently encountered due to "boiling over" which takes place when the utensil and its contents become hot enough so that steam from the liquid within causes portions of the liquid to be carried up over the top of the utensil. Upon striking the air, portions of the steam are condensed with a result that those portions which are carried outside, will fall onto the stove, oftentimes causing a clogging of the burners in kerosene stoves and gas stoves.

It is the primary object of my invention to provide an improved means which will cooperate with the boiling liquid within the utensil, to lift the cover and keep it lifted, thereby permitting sufficient contact with the air to prevent any further tendency to boil over.

Another object of my invention is to provide supporting means for the cover of a cooking utensil which will hold the cover in raised position when the latter is raised by the boiling liquid.

Another and still further object of my invention is the provision of a hollow supporting bracket with a slidable support for the cover and a counter-weight to offset the weight of the cover.

Another and still further object of my invention is to provide a support for adjustably holding the cover of a utensil at varying heights above the upper edge of the same.

Another and still further object of my invention is the provision of a cover having means for holding the same in raised position when raised by the boiling liquid of an utensil and detachable means for disconnecting the cover holder from the utensil.

Another and still further object of my invention is the provision of an adjustable support for an utensil cover having means for swinging the cover to one side yet having a normal tendency to come to a point over the center of the utensil.

Referring to the drawing wherein I have illustrated a preferred embodiment of my invention—

Figure 1 is a fragmental view of a cooking utensil showing the same together with the cover and my improved cover support, partly in section.

Figure 2 is an elevational view on a smaller scale than Figure 1 and showing the support holding the cover in raised position.

Figure 3 is a fragmental view similar to the showing of Figure 2 but illustrating the manner of swinging the cover to one side.

Figure 4 is a cross sectional view of the handle on the line 4—4 of Figure 1.

Similar reference characters refer to the same parts throughout the several views.

10 designates a cooking utensil body having a handle 11 adjacent the body of the utensil. I have provided an inclined pivot member 12 upon which is pivotally supported the supporting member which I have designated generally by the numeral 13. A bearing portion 14 of the supporting member 13 is of a size to fit over the pivot member 12. The supporting member 13 also has an arcuate tubular portion 15 which is provided with an eye 16. The bearing portion 14 is so constructed that it may be placed on or off the pivot 12, at will. When removed, the eye 16 is used to hang up the supporting member 13 when desired.

Within the tubular portion 15, I have shown a means for supporting the cover in the form of an arcuate cylindrical member 17 having a hook 18 at one end and being screw threaded at the other as at 19. On the screw thread is supported a counter weight as the ball 20. This counter-weight is preferably of a weight just sufficient to overcome the weight of the cover and nearly sufficient, in addition, to overcome the friction of the moving parts.

On the hook 18 is hung the utensil cover 21, the hook 17 being in position to permit the cover to close the utensil opening, when lowered.

I will now describe the operation of my invention:—

When the liquid within the cooking utensil boils, the bubbles of steam exert a pressure upon the cover. The cover is so balanced with relation to its counterweight that any upward pressure from under the cover will raise the cover causing a corresponding lowering of the counterweight.

In the event that there is only a slight tendency to boil over, the cover will lift only the amount necessary to prevent overflowing by further boiling. If the boiling over tendency is very strong by violent boiling, then the cover will be lifted a greater amount, thus leaving a greater opening for the outside air to come into contact with the boiling liquid. In either case, however, the cover is not entirely removed which removal would impair the efficiency of the cooking utensil. Furthermore, the cover being over the top of the opening, protection is given to any food which may be in the utensil, against flying dust and dirt.

In order to inspect the contents of the cooking utensil, it is only necessary to swing the cover to one side, the portion 14 turning on the pivot 12. If desired, the hook 18 may be disengaged, and the detachable members 14, 15, 16, 17, 18 may be removed and hung up as a unit, by the eye 16.

While I have illustrated in detail one form of my invention, I desire to have it understood that I do not limit myself to the exact showing and that modifications and changes may be made without departing from the spirit of my invention and within the scope of the appended claims.

Having described my invention what I claim is:—

1. In combination with a cooking utensil, a cover therefor, means carried by the utensil for supporting the cover, said supporting means being so constructed and arranged as to permit the cover to be raised by pressure within the utensil and to automatically retain the cover in any one of a plurality of lifted positions.

2. In combination with a cooking utensil, a cover therefor, means carried by the utensil for supporting the cover, said supporting means being so constructed and arranged as to exert an upward pressure on the cover to permit the same to be raised by a slight pressure within the utensil and to automatically retain the cover in any one of a plurality of lifted positions.

3. In combination with a cooking utensil, a cover therefor, means for supporting the cover and carried by the utensil, said supporting means being so constructed and connected to the cover as to exert a lifting force on the cover and to assist the boiling liquid within the utensil to bodily lift the cover and to retain it in any one of a plurality of lifted positions, the position varying with the violence of the boiling.

4. In combination with a cooking utensil, a cover therefor, means for supporting the cover and carried by the utensil, said supporting means being so constructed and connected to the cover as to exert a substantially vertical lifting force on the cover and to assist the boiling liquid within the utensil to bodily lift the cover and to retain it in any one of a plurality of lifted positions, the position varying with the violence of the boiling.

5. In combination with a cooking utensil, a cover therefor, a bracket extending from the utensil and above the cover, a counter weight and means supported by and movable relatively to the bracket and connecting the counter weight and cover.

6. In combination with a cooking utensil, a cover therefor, a tubular member supported from the utensil and extending above the cover, a counter weight and means within the tube and axially movable therein for connecting the counter weight and cover.

7. In combination with a cooking utensil, a cover therefor, a curved tubular member supported from the utensil, a counter weight and means slidable within the tubular member for connecting the counter-weight and cover.

8. In combination with a cooking utensil, a cover therefor, means for supporting the cover at positions on top of or above the utensil, a bracket for carrying the supporting means and pivoting means for mounting the bracket to provide for swinging the cover to one side of the utensil opening, the supporting means being so constructed as to move the cover upwardly when boiling takes place within the utensil.

9. In combination with a cooking utensil, a cover therefor, means for supporting the cover at a position above the utensil and pivoting means for mounting the supporting means, the axis of the pivot having an inclination toward the axis of the utensil to assist the force of gravity to normally return the cover over the utensil opening.

10. In combination with a cooking utensil, a cover therefor, means for supporting the cover at a position above the utensil, pivoting means having an upwardly extending axis for mounting the supporting means and means connected to the cover supporting means to lift the cover when the liquid beneath the cover boils.

11. In combination with a cooking utensil, a cover therefor, means under control of boiling material within the utensil for supporting the cover at various positions above the utensil and readily detachable means for securing the cover to the supporting means and readily detachable means for securing the supporting means to the utensil, In testimony whereof I hereunto affix my signature.

HENRY J. MEYER.